Feb. 8, 1944.  L. GALEA  2,341,435
PLUMBER'S FISHING TOOL
Filed Aug. 15, 1941
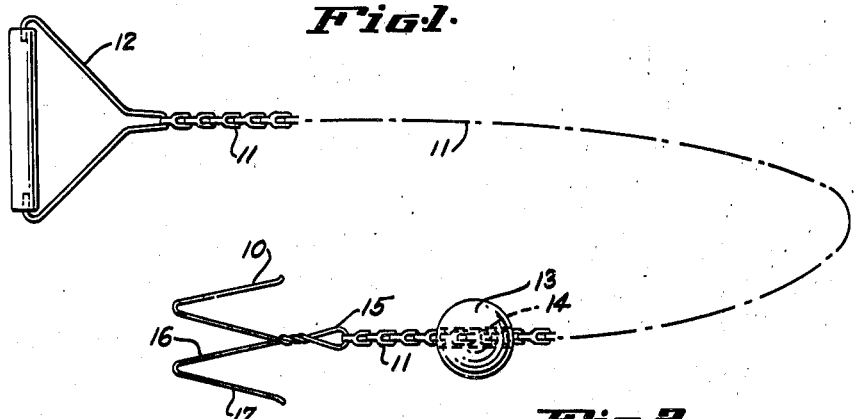
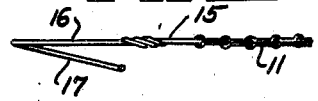
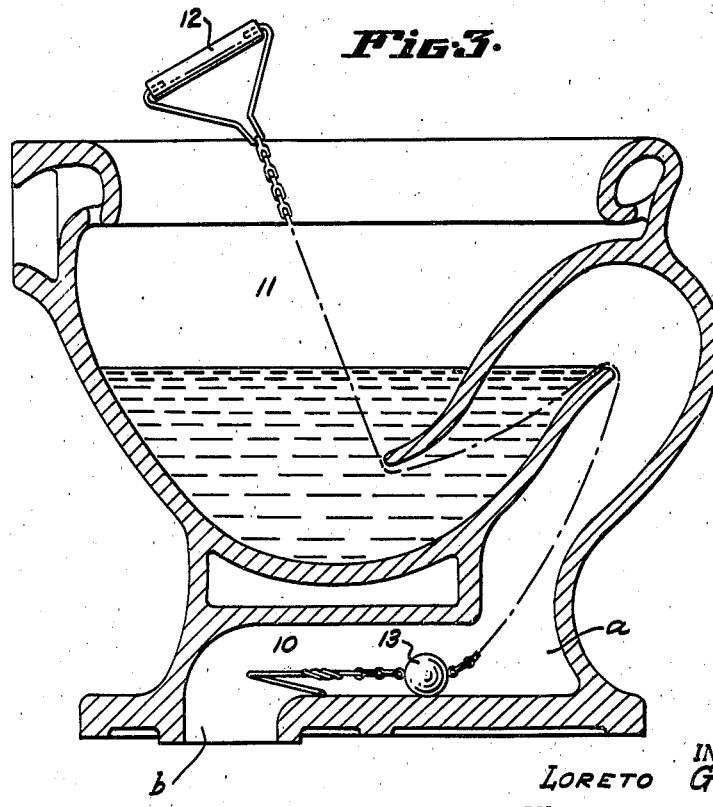
INVENTOR.
LORETO GALEA
BY
Castberg + Roemer
ATTORNEYS Patented Feb. 8, 1944

2,341,435

UNITED STATES PATENT OFFICE 2,341,435

PLUMBER'S FISHING TOOL

Loreto Galea, San Francisco, Calif.

Application August 15, 1941, Serial No. 407,027

2 Claims. (Cl. 15—104.30)

The present invention relates to a plumber's fishing tool and more particularly to a device for retrieving foreign objects from toilet bowls or other inaccessible places in a waste line.

Considerable difficulty is experienced in remedying a stoppage or removing an obstruction in a toilet bowl because of the fact that the bowl is intricate in construction and though formed as a single piece of porcelain, contains a tortuous passage between the trap or water seal and its point of connection with the waste line which connects with the sewer. Such articles as toothbrushes, combs and pencils, if dropped in the bowl often find their way through the trap and become lodged within the bowl to cause an obstruction, which, unless removed, eventually results in a complete stoppage. The foreign object frequently becomes so securely lodged that it is not effected by pressure or suction devices and even if it were, might only be loosened to travel farther in the waste line and lodge at some other point.

Conventional cables used by plumbers in fishing for obstructions in waste lines, though flexible are unsatisfactory for manipulation through the passages of a toilet bowl. It is the object of the present invention to provide a tool of simple and inexpensive construction for dislodging and removing foreign bodies from toilet bowls by means of which a grappling hook, or other retrieving instrument may conveniently be passed completely through the bowl and easily retracted after it engages with the foreign body.

Further objects and advantages of the invention are made apparent in the following specification wherein reference is made to the accompanying drawing which illustrates a preferred form of the invention. In the drawing, Fig. 1 is an illustration of a plumber's fishing tool constructed in accordance with the present invention, showing the grappling hook in plan, Fig. 2 is a side elevation of the grappling hook only, illustrated in Fig. 1, and Fig. 3 is a vertical longitudinal section through a typical washdown toilet bowl showing the position assumed by the tool of the present invention just before it is withdrawn to remove an obstruction.

The invention as shown in Fig. 1 comprises a grappling hook 10 secured at one end by a chain 11, the opposite end of which is fastened to a handle 12. Intermediate the ends of the chain is a ball 13 provided with an axial hole 14, shown in dotted lines through which the chain 11 passes.

The chain 11 is preferably a piece of galvanized safety chain, but may be any flexible member such as a cord or very light cable, as distinguished from the resilient steel tape or coil spring cable ordinarily used by plumbers for fishing for foreign objects in a waste line. The degree of flexibility of the member 11 should be such as to permit it to pass freely around any bend in a toilet bowl or waste line where the ball 13 is capable of being passed by the action of water flushed through the toilet or waste line.

The ball 13 is formed of sponge rubber with an axial hole 14 of sufficient size to permit the chain to slide therethrough, though this ball may be formed of any suitable material and preferably one which, though light, is of sufficient specific gravity to prevent its floating in water, at least when it is weighted by the chain or other flexible member to which it is attached. While illustrated as sliding on the chain 11, the ball may be securely fixed thereto in approximately the position shown in Fig. 1 and it is not necessarily of spherical shape, though it is preferably sufficiently rounded in contour to permit its easy passage through the toilet bowl.

The handle 12 may be of any convenient design but it is preferably sufficiently large to prevent its passing through the trap of the bowl.

The grappling hook 10 may be formed of heavy galvanized wire or similar material and while any desired type of grapping hook may be employed in the combination shown, the one illustrated has been found suitable for retrieving objects lodged in toilet bowls and consists of a similar piece of wire twisted to form an eye 15 for connection with the chain 11 and having ends extending forwardly as at 16 and rearwardly as at 17. The rearwardly extended portions 17 are preferably inclined downwardly, as shown in Fig. 2 and their ends are provided with a slight bend which, if they become engaged with a ledge or crevice, is sufficient to cause the hook to tilt and release itself. A hook of this kind forms a sort of cradle which is particularly well adapted for the removal of long slender objects which are ordinarily difficult to engage with a grappling hook.

Objects dropped in the toilet bowl most frequently become lodged either at the lower forward corner indicated by reference character $a$ in Fig. 3 or at the point $b$ where the bowl connects with a waste line. To remove an object so lodged, a tool of the present invention is employed by dropping the grappling hook 10 and ball 13 into the bowl and flushing the toilet. The flow of water through the trap carries the ball toward the outlet point $b$ and the grappling hook 10 is carried with the ball to a point beyond the obstruction. It is important that the chain 11 be sufficiently flexible to permit a free movement of the ball through the tortuous passage of the bowl and as the handle 12 is too large to pass through the trap, it will always remain in a position where it may be grasped to retract the grappling hook, which, upon being retracted, becomes engaged with the foreign object and withdraws it from the bowl.

Having thus described my invention, what I claim and desire to secure by Letters Patent is—

1. A tool for recovering foreign objects in toilet bowls, comprising a chain, a grappling hook at one end thereof, and a perforated ball sliding on said chain to occupy a position adjacent said grappling hook whereby the ball and grappling hook may be washed through the bowl by normal flushing action.

2. A tool for recovering foreign objects in toilet bowls, comprising a chain, a grappling hook at one end thereof, and a perforated ball sliding on said chain to occupy a position adjacent said grappling hook whereby the ball and grappling hook may be washed through the bowl by normal flushing action, and a handle on the opposite end of said chain for retracting said grappling hook.

LORETO GALEA.